US008616403B2

(12) United States Patent
Hisadomi et al.

(10) Patent No.: US 8,616,403 B2
(45) Date of Patent: Dec. 31, 2013

(54) FUEL FILLER PORT DEVICE OF FUEL TANK FOR STRADDLED VEHICLE (75) Inventors: Masaru Hisadomi, Wako (JP); Hiroyuki Maeda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 12 days.

(21) Appl. No.: 13/580,773

(22) PCT Filed: Mar. 23, 2010

(86) PCT No.: PCT/JP2010/054953
§ 371 (c)(1),
(2), (4) Date: Sep. 18, 2012

(87) PCT Pub. No.: WO2011/117962
PCT Pub. Date: Sep. 29, 2011

(65) Prior Publication Data
US 2013/0008899 A1    Jan. 10, 2013

(51) Int. Cl.
*B60P 3/00*    (2006.01)
(52) U.S. Cl.
USPC ........... 220/562; 220/86.2; 220/563; 220/564
(58) Field of Classification Search
USPC .................................. 220/562–564, 86.1, 86.2
See application file for complete search history.

(56) References Cited

U.S. PATENT DOCUMENTS

2010/0288763 A1*  11/2010  Muto et al. .................. 220/86.2

FOREIGN PATENT DOCUMENTS

| JP | 58-86726 | U | 6/1983 |
| JP | 3-128519 | U | 12/1991 |
| JP | 2009-101854 | A | 5/2009 |
| JP | 2009-101855 | A | 5/2009 |

* cited by examiner

*Primary Examiner* — David T. Fidei
*Assistant Examiner* — Raven Collins
(74) *Attorney, Agent, or Firm* — Birch, Stewart, Kolasch & Birch, LLP (57) ABSTRACT Disclosed is a fuel filler port device that is of a fuel tank for a straddled vehicle and that can utilize the upper space of the fuel tank without leading to an increase in size of a fuel filler guide tube. The fuel filler port device (60) of a fuel tank for a straddled vehicle is provided with: a fuel filler guide tube (61) that extends from the fuel filler port (53) provided to the upper wall of the fuel tank (16) to the interior of the fuel tank (16), and a flame arrester (62) that is disposed at the bottom of the fuel filler guide tube (61); and the flame arrester (62) is provided in a manner allowing a nozzle (N) of a fuel gun inserted from the fuel filler port (53) to be inserted lower than the upper end of the flame arrester (62).

6 Claims, 11 Drawing Sheets

FUEL FILLER PORT DEVICE OF FUEL TANK FOR STRADDLED VEHICLE

TECHNICAL FIELD

The present invention relates to a fuel filler port device of a fuel tank for a straddled vehicle.

BACKGROUND ART

Fuel tanks have been provided to straddled vehicles such as motorcycles. In fuel tanks, a fuel filler port device has been provided that includes: a fuel filler guide tube that extends to inside of the fuel tank from a fuel filler port provided in the superior wall thereof, and into which the nozzle of a fuel filler gun is inserted; a flame arrester that covers the opening at the lower end of the fuel filler guide tube, and permits the flow of fuel from the nozzle to inside of the fuel tank; and a gun stopper positioned above the flame arrester and preventing contact between the nozzle inserted inside of the fuel filler guide tube and the flame arrester.

Patent Document 1 proposes a fuel filler port device provided with a cylindrical skirt at the circumference of the flame arrester, and in which vents are formed in the skirt and the fuel filler guide tube, respectively. With the fuel filler port device proposed in Patent Document 1, in a case where the fuel level inside of the fuel tank has risen to at least the lower end of the skirt accompanying fuel filling, the air in the upper portion of the fuel tank is discharged from the vents formed in the skirt and the vents formed in the fuel filler guide tube, whereby the flow of fuel to inside of the fuel tank is carried out smoothly. Then, when the fuel level reaches the level of the vents formed in the skirt or higher, the discharge of air in the upper portion of the fuel tank will be only from the vents formed in the fuel filler guide tube, and the fuel level will rise inside of the fuel filler guide tube. The fuel filler operator observing this situation will notice that fuel has filled the fuel tank.

Patent Document 1: Japanese Unexamined Patent Application, Publication No. 2009-101854

DISCLOSURE OF THE INVENTION

Problems to be Solved by the Invention

However, if the fuel level inside of the fuel tank is the level of the vents formed in the skirt or higher, the amount of fuel entering the fuel tank thereafter will be subject to the limitation in the size of the fuel filler guide tube. As a result, depending on the size of the fuel filler guide tube, the vents provided in the skirt will be positioned below the gun stopper; therefore, the fuel full tank level may be lower than the leading end portion of the nozzle of the fuel filler gun. In addition, if trying to increase the stored amount of fuel using the space in the upper portion of the fuel tank, it will lead to an increase in the size of the fuel filler guide tube, and the fuel tank will be larger.

Therefore, the present invention has an object of providing a fuel filler port device of a fuel tank for a straddled vehicle that can increase the stored amount of fuel using the space at the upper portion of the fuel tank, without leading to an increase in the size of the fuel filler guide tube.

Means for Solving the Problems

A first aspect of the invention is a fuel filler port device of a fuel tank for a straddled vehicle including: a fuel filler guide tube that extends from a fuel filler port provided at a superior wall of a fuel tank to inside of the fuel tank, and guides a nozzle of a fuel filler gun inserted from the fuel filler port to inside of the fuel tank; and a flame arrester that is disposed below the fuel filler guide tube and permits flow of fuel to inside of the fuel tank, and allows air inside of the fuel tank to discharge, in which the flame arrester is provided to allow the nozzle of the fuel filler gun inserted from the fuel filler port to be inserted lower than an upper end of the flame arrester.

In addition to the configuration as described in the first aspect, a second aspect of the invention further includes: a gun stopper that has an abutting portion disposed below the fuel filler guide tube and abutting a leading end side of the nozzle, and that restricts insertion of the nozzle to inside of the fuel tank, in which the flame arrester is disposed to span positions from above to below the abutting portion.

In addition to the configuration as described in the second aspect, according to a third aspect of the invention, the flame arrester includes a peripheral wall of cylindrical shape surrounding an entire circumference of the nozzle inserted inside of the fuel filler guide tube, and the peripheral wall includes a plurality of communicating holes formed over an entire periphery thereof.

In addition to the configuration as described in the third aspect, according to fourth aspect of the invention, the flame arrester further includes a cap member covering a lower end side of the peripheral wall, in which the cap member has a plurality of communicating holes.

In addition to the configuration as described in any one of the second to fourth aspects, according to the fifth aspect of the invention, the gun stopper and the flame arrester are directly or indirectly fixed to the fuel filler guide tube, and the fuel filler guide tube is fixed to the fuel filler port.

In addition to the configuration as described in any one of the third to fifth aspects, according to a sixth aspect of the invention, the gun stopper is disposed so as to traverse inside of the peripheral wall in a radial direction, and is fixed to the peripheral wall at both ends of the gun stopper.

In addition to the configuration as described in the any one of the first to sixth aspects, according to a seventh aspect of the invention, a length of the fuel filler guide tube in an axial direction is shorter than a length of the flame arrester in the axial direction.

In addition to the configuration as described in the second aspect, according to an eighth aspect of the invention, the abutting portion is positioned at a center of the frame arrester in an axial direction.

In addition to the configuration as described in the fourth aspect, according to a ninth aspect of the invention, a diameter of the plurality of communicating holes in the cap member is greater than a diameter of the plurality of communicating holes in the peripheral wall.

Effects of the Invention

According to the first aspect of the invention, the flame arrester makes it possible for the leading end portion of the nozzle of the fuel filler gun inserted to inside of the fuel filler guide tube to be inserted lower than the upper end of the flame arrester. The air in the upper portion of the fuel tank can thereby be discharged by way of a portion of the flame arrester positioned higher than the leading end portion of the nozzle, and fuel can be allowed to flow to inside of the fuel tank. Therefore, it is possible to increase the stored amount of fuel using the space in the upper portion of the fuel tank, without leading to an increase in the size of the fuel filler guide tube.

According to the second aspect of the invention, the gun stopper having the abutting portion at which the leading end side of the nozzle abuts is disposed below the fuel filler guide tube, and the flame arrester is disposed to span from above to below the abutting portion. The air in the upper portion of the fuel tank can thereby be discharged by way of a portion of the flame arrester positioned higher than the abutting portion, and fuel can be allowed to flow to inside of the fuel tank. Therefore, by raising the liquid surface level of the fuel tank to higher than the abutting portion of the gun stopper, it is possible to increase the stored amount of fuel using the space at the upper portion of the fuel tank, without leading to an increase in the size of the fuel filler guide tube.

According to the third aspect of the invention, the flame arrester is configured to include a peripheral wall that surrounds the entire circumference of the nozzle, and a plurality of communicating holes is formed over the entire circumference of the peripheral wall. The flow of fuel to inside of the fuel tank and the discharge of air inside of the fuel tank through the plurality of communicating holes are thereby made smooth.

According to the fourth aspect of the invention, the flame arrester is configured to include a cap member that covers a lower end side of the peripheral wall, and a plurality of communicating holes is formed in the cap member. The flow of fuel to inside of the fuel tank and the discharge of air inside of the fuel tank through the plurality of communicating holes in the cap member are thereby made smoother.

According to the fifth aspect of the invention, the gun stopper and the flame arrester are fixed to the fuel filler guide tube, and the fuel filler guide tube is fixed to the fuel filler port. Since the fuel filler guide tube, gun stopper and flame arrester are thereby mounted to the fuel tank in subassembly form, the mounting of the fuel filler guide tube, gun stopper, and flame arrester to the fuel tank is facilitated.

According to the sixth aspect of the invention, the gun stopper is disposed so as to traverse the peripheral wall in the radial direction, and both ends of the gun stopper are fixed to the peripheral wall. It is thereby possible to improve the rigidity against forces applied in the radial direction on the peripheral wall.

Since the air inside of the fuel tank is not discharged from the periphery of the fuel filler guide tube, a space in which it is difficult to contain fuel is formed at the periphery of a portion inside of the fuel tank at which the fuel filler guide tube is disposed. Therefore, according to the seventh aspect of the invention, the length of the fuel filler guide tube in the axial direction is shorter than the length of the flame arrester in the axial direction. The volume of the space formed at the periphery of the fuel filler guide tube and in which air does not escape and it is difficult to contain fuel can thereby be made smaller.

According to the eighth aspect of the invention, the abutting portion is positioned in the center of the flame arrester in the axial direction. The abutting portion thereby comes to be positioned at an adequate depth from the fuel filler port, whereby the nozzle can be inserted an adequate length from the fuel filler port. In addition, since the flame arrester is disposed until above the abutting portion, while the abutting portion is at a sufficient depth from the fuel filler port, air in an upper portion of the fuel tank can be discharged, and fuel can be allowed to flow inside of the fuel tank, by way of the flame arrester positioned higher than the abutting portion.

According to the ninth aspect of the invention, the diameter of the plurality of communicating holes in the cap member is configured to be larger than the diameter of the plurality of communicating holes in the peripheral wall. Therefore, since fuel can be smoothly supplied from the plurality of communicating holes of the cap member disposed lower than the peripheral wall, the decline in the supply rate of fuel can be reduced.

EXPLANATION OF REFERENCE NUMERALS 1 motorcycle (straddled vehicle)
16 fuel tank
49 tank upper
53 fuel filler port
60 fuel filler port device
61 fuel filler guide tube
62 flame arrester
63 gun stopper
66 peripheral wall
67 cap member
68 communicating hole
71 communicating hole
72 abutting portion
N nozzle

PREFERRED MODE FOR CARRYING OUT THE INVENTION

Hereinafter, embodiments of the present invention will be explained while referencing the drawings.

Figure 1:
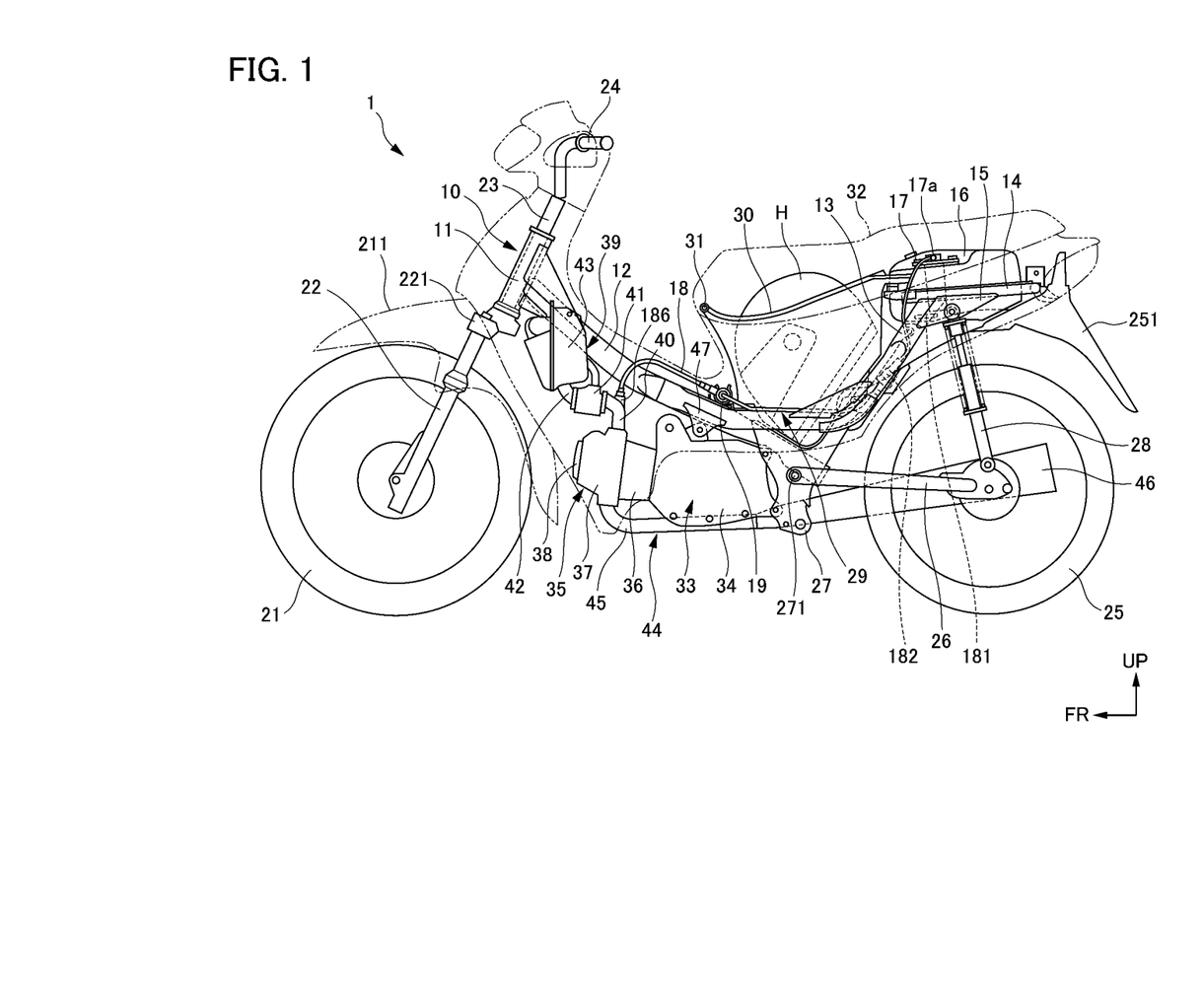
FIG. 1 is a left-side view showing a motorcycle equipped with a fuel tank including a fuel filler port device according to a first embodiment of the present invention.
Figure 2:
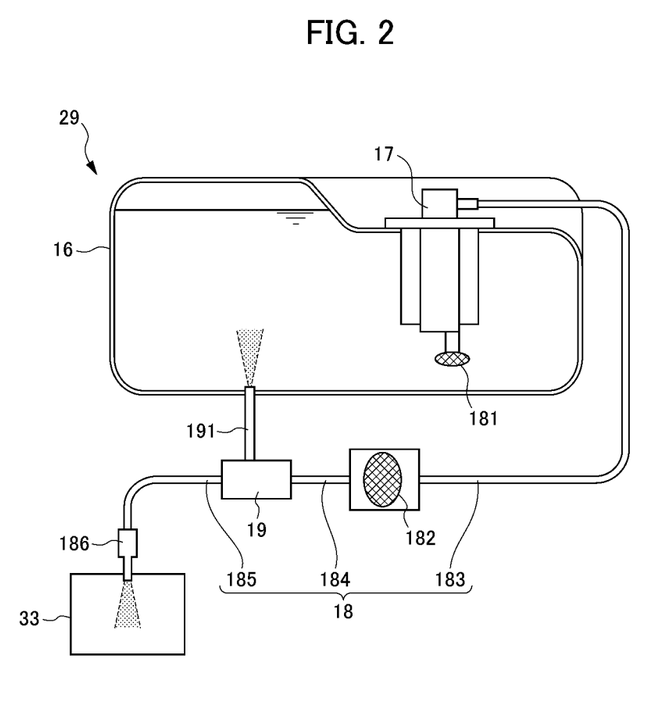
FIG. 2 is a view schematically showing the configuration of fuel supply equipment.

First, the overall configuration of a motorcycle 1 as a straddled vehicle equipped with a fuel tank including a fuel filler port device according to a first embodiment will be explained while referencing FIGS. 1 and 2. FIG. 1 is a left-side view showing a motorcycle equipped with the fuel tank including the fuel filler port device according to the first embodiment of the present invention. FIG. 2 is a view schematically showing the configuration of fuel supply equipment. It should be noted that descriptions of front-rear, left-right and upper-lower in the following explanation are in accordance with the directions viewed from rider (driver) riding on the motorcycle, unless particularly specified. In addition, the arrow FR in the drawings indicates ahead of the vehicle, and the arrow UP indicates above the vehicle.

As shown in FIG. 1, the motorcycle 1 of the first embodiment includes: a chassis frame 10 configured to include a head pipe 11 and seat rails 13; a front wheel 21 disposed ahead of the chassis frame 10; a front fender 211 disposed above the front wheel 21; a left and right pair of front forks 22 that pivotally support the front wheel 21; a steering stem 23 that supports these front forks 22 through a bottom bridge 221 to the head pipe 11 to be rotatable left and right; handlebars 24 joined at an upper end of the steering stem 23; a rear wheel 25 disposed behind the chassis frame 10; a rear fender 251 disposed above the rear wheel 25; a swing arm 26 pivotally supporting the rear wheel 25 at a rear end thereof; pivot plates 27 that support the swing arm 26 to the chassis frame 10 to freely swing up and down; rear cushions 28 interposing between the swing arm 26 and seat rails 13; fuel supply equipment 29 configured to include the fuel tank 16; a storage box 30 that houses a helmet H; a seat 32 disposed above the storage box 30; and an engine 33 disposed below the chassis frame 10.

The chassis frame 10 is configured by a plurality of types of steel stock being integrally joined by welding or the like. The chassis frame 10 includes the head pipe 11, main frame 12, the seat rails 13, rear frame 14, and a plurality of cross-members (not illustrated).

The head pipe 11 is disposed at a front end of the chassis frame 10.

The main frame 12 has a front end in a side view connected to the head pipe 11. The main frame 12 extends obliquely downwards and to the rear from the head pipe 11.

The seat rails 13 are connected to a rear-end side of the main frame 12. The seat rails 13 are provided as a pair on the left and right. In a side view, the pair of seat rails 13 has a front end connected to the main frame 12. The pair of seat rails 13 extends rearwards from the left and right of a middle part of the main frame 12, then bends midway to extend obliquely upwards to the rear. The rear-end side of the pair of seat rails 13 is connected to the rear frame 14.

The rear frame 14 is formed in a U shape in a plan view. Both ends of the rear frame 14 are respectively connected to the pair of seat rails 13.

The cross-members (not illustrated) are made from pipe members that extend in the left-right direction, for example, and connect the left and right pair of seat rails 13 in the left-right direction.

The front forks 22 are provided as a pair on the left and right. The pair of front forks 22 is supported through the steering system 23 to the head pipe 11 at a lower side of the head pipe 11. An upper end of the steering system 23 is connected to a lower end of the handlebars 24.

The pivot plates 27 are provided as a pair on the left and right. The pair of pivot plates 27 is connected to a middle part of the pair of seat rails 13, and pivotally supports the swing arm 26.

The swing arm 26 includes a pair of arm portions on the left and right. The swing arm 26 has a front end supported through a pivot shaft 271 to the pivot plates 27 to freely swing up and down, and a rear end rotatably supporting the rear wheel 25.

The rear cushions 28 are provided as a pair on the left and right. The pair of rear cushions 28 has a lower end connected to the rear end of the pair of arm portions, and an upper end connected through cushion gussets 15 to the rear end of the pair of seat rails 13.

As shown in FIGS. 1 and 2, the fuel supply equipment 29 includes: the fuel tank 16, a fuel pump 17 mounted to an upper portion of the fuel tank 16; a fuel supply line 18 that supplies fuel from the fuel tank 16 to the engine 33; a pressure regulator 19 provided in the fuel supply line 18; a fuel return line 191 (refer to FIG. 2) having one end linked to the pressure regulator 19 and the other end linked to the fuel tank 16; a first filter 181 disposed inside of the fuel tank 16; and a second filter 182 disposed in the fuel supply line 18.

The fuel tank 16 is mounted to the rear frame 14. The fuel pump 17 takes in the fuel inside of the fuel tank 16, and supplies through the fuel supply line 18 to the engine 33, as shown in FIG. 2.

The fuel supply line 18 includes a first fuel pipe 183 connecting the fuel pump 17 and the second filter 182; a second fuel pipe 184 connecting the second filter 182 and the pressure regulator 19; and a third fuel pipe 185 connecting the pressure regulator 19 and the engine 33 through an injector 186.

The pressure regulator 19 adjusts so that the pressure of fuel supplied from the fuel tank 16 to the engine 33 (third fuel pipe 185) becomes a predetermined pressure. More specifically, the pressure regulator 19 adjusts the pressure of fuel supplied at an engine 33 (third fuel pipe 185) side, by returning a part of the fuel supplied from the second fuel pipe 184 to the pressure regulator 19 back to the fuel tank 16.

The fuel return line 191 returns a part of the fuel flowing through the fuel supply line 18 back to the fuel tank 16.

The first filter 181 is configured by a nonwoven fabric formed in a planar shape, and is disposed inside of the fuel tank 16 in a vicinity of a fuel inlet port of the fuel pump 17. The second filter 182 is mounted in the fuel supply line 18 (connection between the first fuel pipe 183 and second fuel pipe 184). The mesh of the second filter 182 is configured to be finer than the mesh of the first filter 181.

According to the above fuel supply equipment 29, the fuel contained inside of the fuel tank 16 passes through the first filter 181 and second filter 182, whereby foreign particles mixed in the fuel are removed, and then is supplied from the injector 186 to the engine 33. Herein, since the mesh of the second filter 182 is configured to be finer than the mesh of the first filter 181, foreign particles can be collected by the second filter 182 even in a case of using a fuel such as ethanol in which fine foreign particles are mixed. In addition, by the second filter 182 being configured to have a fine mesh, although clogging tends to occur and the replacement frequency is greater compared to the first filter 181, the second filter 182 differs from the first filter 181 provided inside of the fuel tank 16, and is installed in the fuel supply line 18; therefore, replacement is easy.

The storage box 30 is mounted ahead of the rear frame 14 by bolts and nuts (neither illustrated). The storage box 30 makes a box shape having an opening at an upper part, and is formed to be large so that the helmet H of full-face type can be stored therein.

The seat 32 for rider (driver and rear passenger) seating is mounted through a hinge 31 to a front-end upper portion of the storage box 30.

The engine 33 is equipped at a substantially central portion of the vehicle in the front-rear direction, as shown in FIG. 1. The engine 33 includes a crankcase 34; a cylinder portion 35 having a cylinder block 36 and a cylinder head 37; and an intake device 39 and exhaust device 44 connected to the cylinder head 37.

The crankcase 34 has an upper portion supported through an engine bracket 47 from a lower side of the main frame 12, and a rear portion supported from a front side of the pivot plates 27. The crankcase 34 houses the crankshaft and transmission mechanism (neither illustrated).

The cylinder portion 35 includes the cylinder block 36 mounted ahead of the crankcase 34; the cylinder head 37 mounted ahead of the cylinder block 36; and a cylinder-head cover 38 that covers an opening of the cylinder head 37.

The intake device 39 includes intake plumbing 40 joined to an upper portion of the cylinder head 37; a throttle body 41 that is joined to the intake plumbing 40; and an air cleaner 43 that is joined through a connecting tube 42 to the throttle body 41. The fuel supply line 18 is joined to the intake plumbing 40. The air cleaner 43 is mounted to a front lower side of the main frame 12. The air cleaner 43 cleans the air supplying the engine 33.

The exhaust device 44 includes exhaust plumbing 45 that is joined to a lower portion of the cylinder head 37; and a silencer 46 that is joined to a rear portion of the exhaust plumbing 45. The exhaust plumbing 45 curves below the cylinder head 37 and extends towards the rear. The silencer 46 is disposed on a right side of the rear wheel 25.

Figure 3:
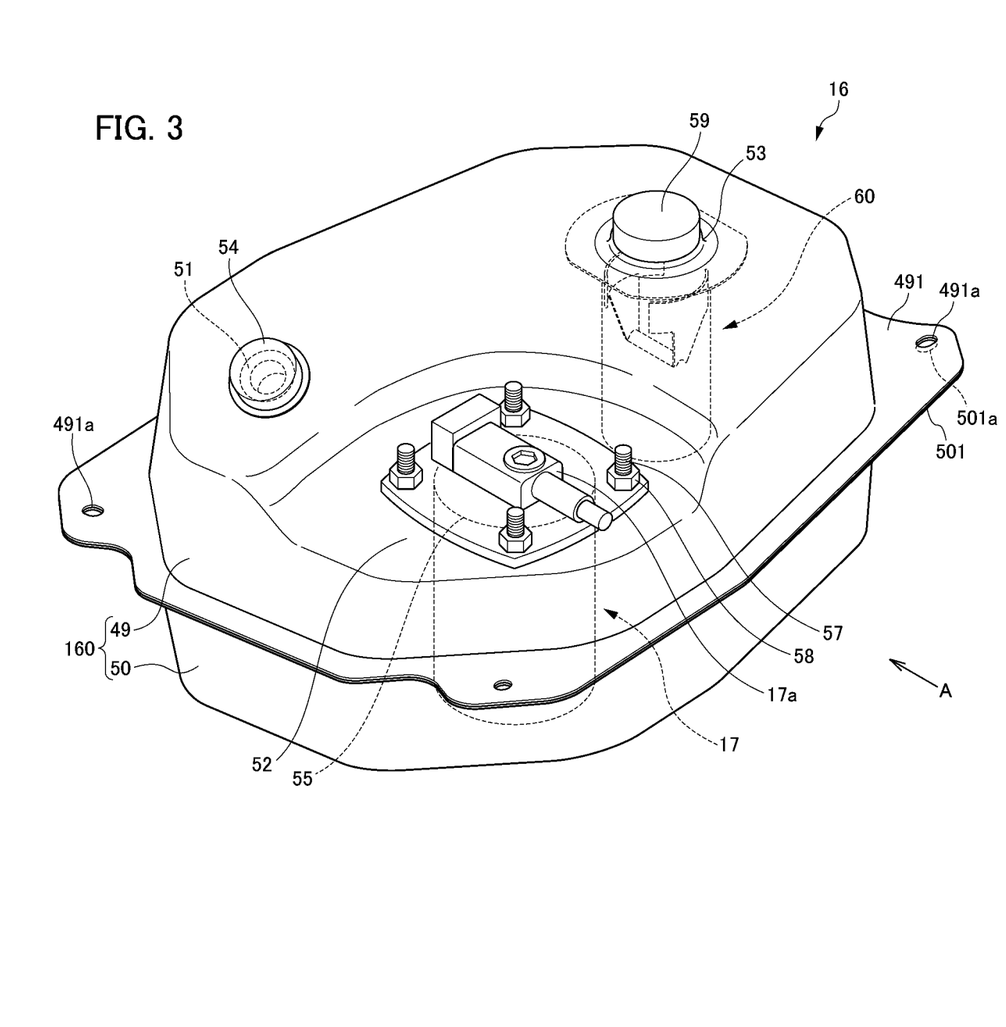
FIG. 3 is a perspective view showing the fuel tank shown in FIG. 1.
Figure 4:
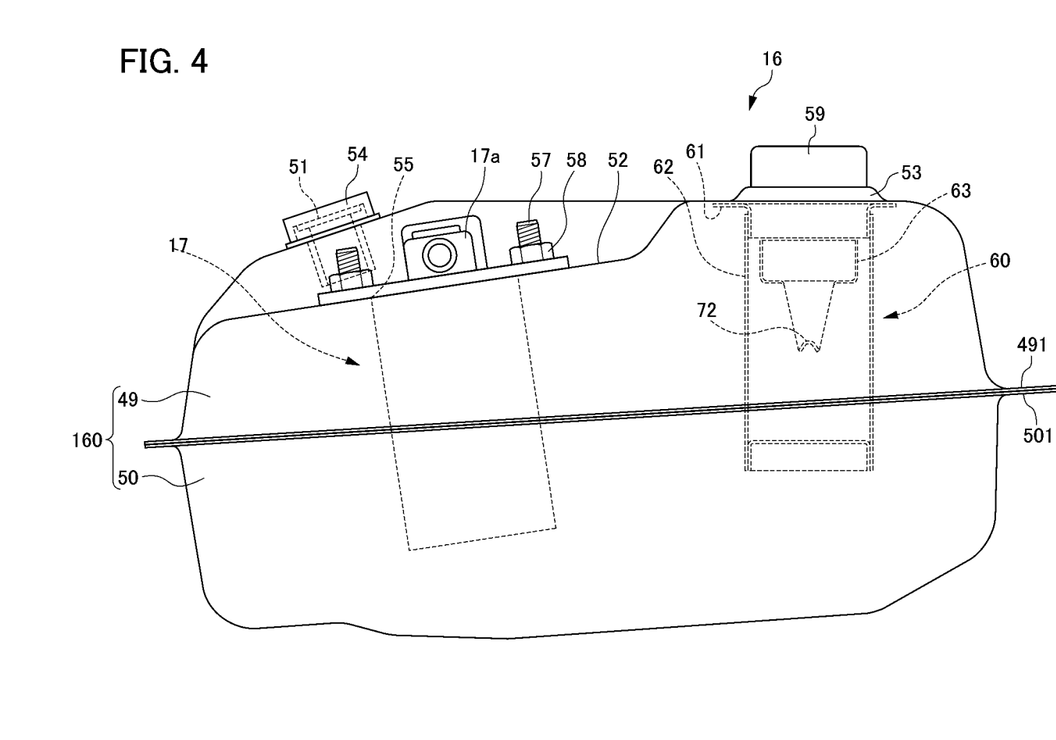
FIG. 4 is a side view when viewing the fuel tank in the arrow A direction indicated in FIG. 3.
Figure 5:
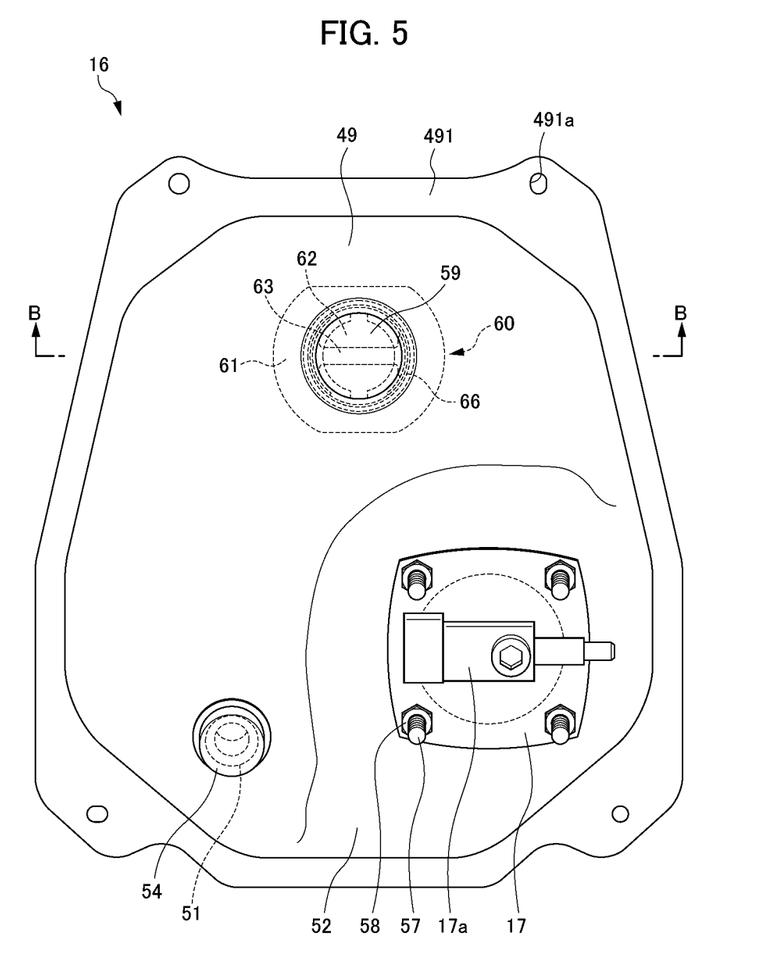
FIG. 5 is a plan view of the fuel tank shown in FIG. 1.

Next, the overall configuration of the fuel tank 16 equipped with the fuel filler port device according to the first embodiment will be explained while referencing FIGS. 3 to 5. FIG. 3 is a perspective view showing the fuel tank 16. FIG. 4 is a side view when viewing the fuel tank 16 in the arrow A direction indicated in FIG. 3. FIG. 5 is a plan view showing the fuel tank 16.

The fuel tank 16 of the first embodiment is a container storing fuel, and includes a fuel-tank main body 160 and a fuel filler port device 60 mounted to the fuel tank main body 160, as shown in FIGS. 3 and 4.

The fuel-tank main body 160 includes a tank upper 49 and a tank lower 50 press molded from a steel sheet. The tank upper 49 and tank lower 50 include peripheral edges 491, 501 of a flat plate shape. The fuel tank 16 is configured by the respective peripheral edges 491, 501 of the tank upper 49 and tank lower 50 being integrally joined by welding. The tank upper 49 configures a side-wall upper portion and superior wall of the fuel tank 16. The tank lower 50 configures a side-wall lower portion and inferior wall of the fuel tank 16.

The tank upper 49 includes a plurality of bolt holes 491a formed substantially at the four corners of the peripheral edge 491; a fuel drain hole 51 used when draining the fuel inside of the fuel tank 16; a pump mounting portion 52 to which the fuel pump 17 is mounted; and a fuel filler port 53 formed at a location configuring the superior wall of the fuel tank 16 and to which the fuel filler port device 60 is mounted on an interior of the fuel tank 16.

The tank lower 50 includes a plurality of bolt holes 501a formed at substantially the four corners of the peripheral edge 501 at locations opposing the bolt holes 491a of the tank upper 49.

The fuel tank 16 is fixed to the rear frame 14 by bolts passing through the bolt holes 491a, 501a and nuts disposed on a rear frame 14 side (neither illustrated)

The fuel drain hole 51 is an opening penetrating the tank upper 49, and is blocked by a drain plug 54. The drain plug 54 is removed when draining the fuel inside of the fuel tank 16. By the drain plug 54 being removed, the fuel drain hole 51 communicates the inside and outside of the fuel tank 16, and makes it possible to drain the fuel inside of the fuel tank 16.

The pump mounting portion 52 is configured by the superior wall of the fuel tank 16 being formed to be a step lower than the periphery. The pump mounting portion 52 includes a pump mounting opening 55 formed at substantially the center of the superior wall configuring the pump mounting portion 52. The pump mounting opening 55 is an opening penetrating the tank upper 49, and the fuel pump 17 is installed in the pump mounting opening 55.

The fuel pump 17 has a substantially cylindrical shape, as shown in FIGS. 3 and 4. The fuel pump 17 has an upper end 17a projecting from the superior wall of the fuel tank 16 in a sate installed in the pump mounting opening 55. The height of the upper end 17a of the fuel pump 17 becomes somewhat lower compared to the height of the superior wall around the pump mounting portion 52. The fuel pump 17 is fixed to the pump mounting portion 52 by bolts 57 and nuts 58.

The fuel filler port 53 has an opening portion 531 penetrating the tank upper 49, and is blocked by a filler cap 59, a shown in FIG. 3. More specifically, the steel sheet configuring the tank upper 49 is folded downwards at the opening portion 531, and a lower end side of the filler cap 59 is inserted in the opening portion 531 (refer to FIG. 8). The filler cap 59 is removed when filling fuel. By the filler cap 59 being removed, the fuel filler port 53 communicates the inside and outside of the fuel tank 16, whereby fuel filling to inside of the fuel tank 16 is made possible. The fuel filler port device 60 is fixed to the peripheral edge of the fuel filler port 53 by welding from the interior of the fuel tank 16, prior to welding of the tank upper 49 and tank lower 50.

Figure 6:
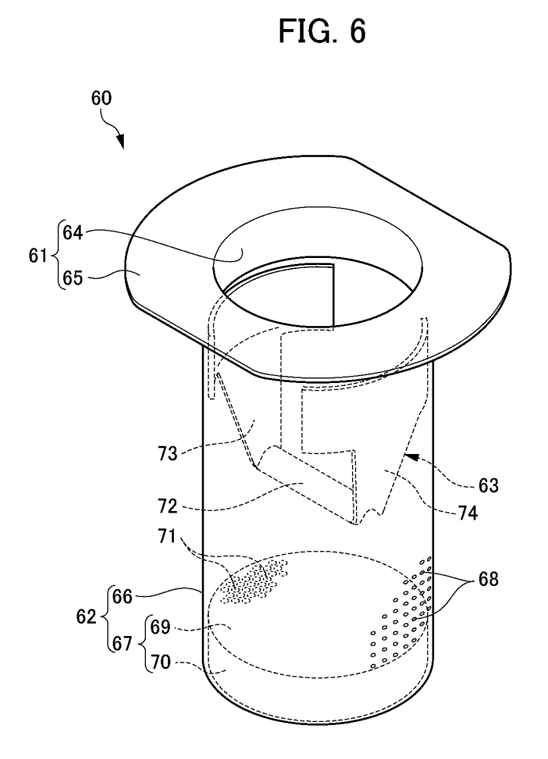
FIG. 6 is a perspective view showing the fuel filler port device according to the first embodiment.
Figure 7:
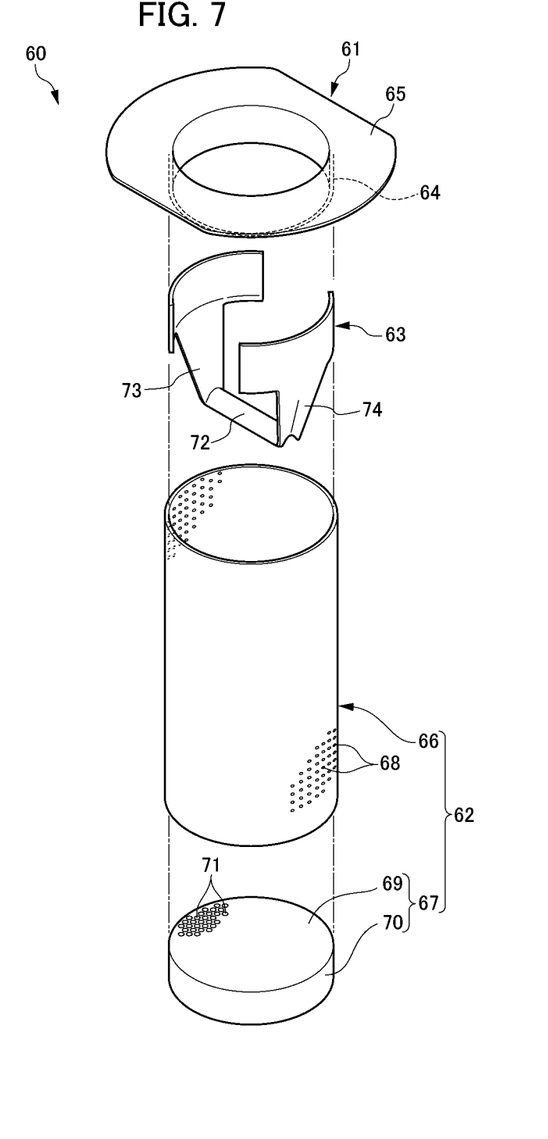
FIG. 7 is an exploded perspective view of the fuel filler port device.
Figure 8:
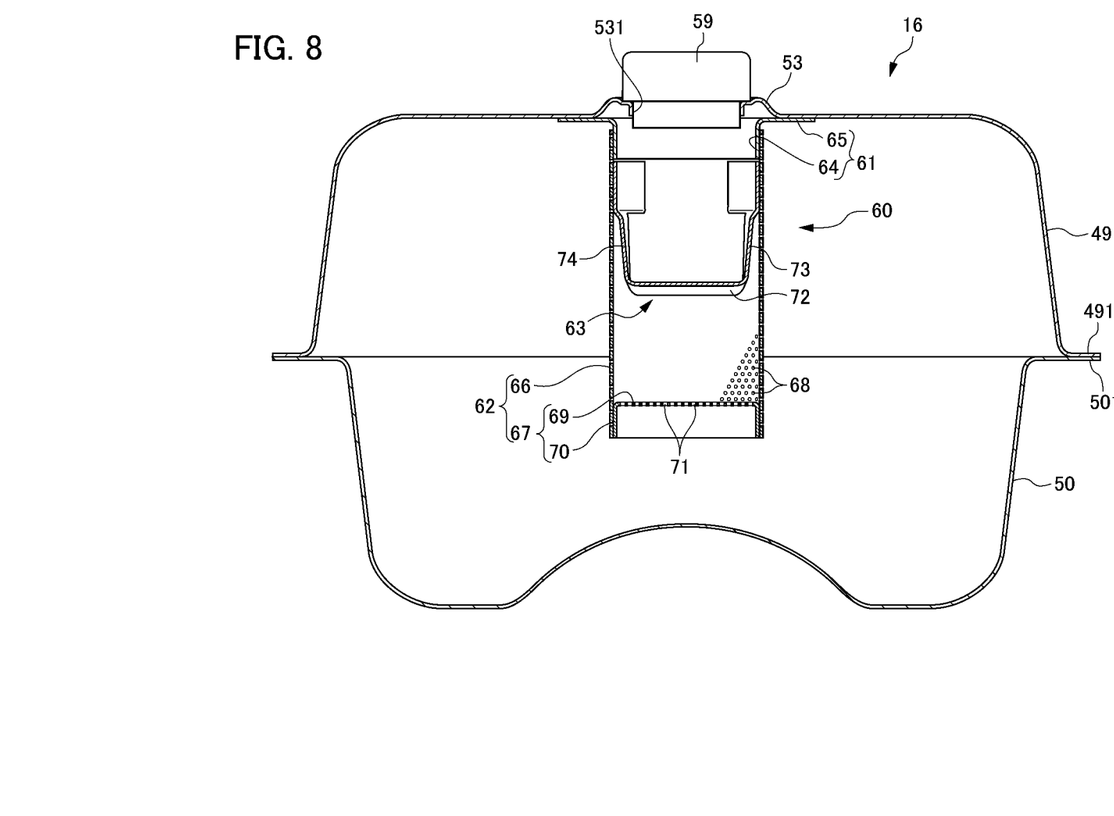
FIG. 8 is a cross-sectional view around the fuel filler port of the fuel tank, which is a cross-sectional view along the line B-B indicated in FIG. 5.
Figure 9:
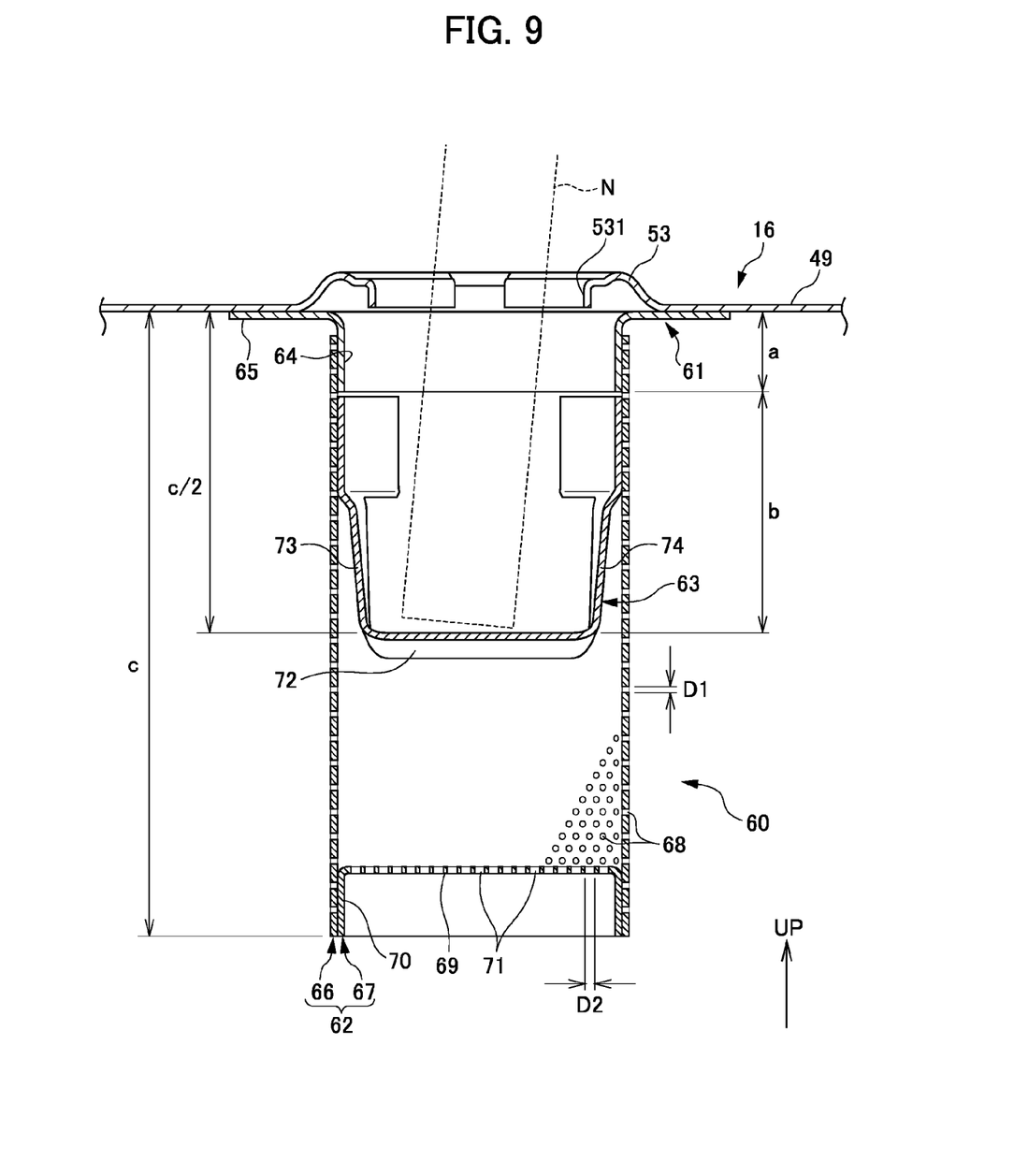
FIG. 9 is a partially enlarged view of FIG. 8.

Next, the fuel filler port device 60 according to the first embodiment will be explained. FIG. 6 is a perspective view showing the fuel filler port device 60, and FIG. 7 is an exploded perspective view. FIG. 8 is a longitudinal sectional view of the fuel filler port device 60, which is a cross-sectional view along the line B-B indicated in FIG. 5. FIG. 9 is a partially enlarged view of FIG. 8.

As shown in FIGS. 6 to 8, the fuel filler port device 60 according to the first embodiment is configured by a plurality of steel stocks being integrally joined by welding. The fuel filler port device 60 includes a fuel filler guide tube 61 extending from the fuel filler port 53 to inside of the fuel tank 16 and into which a nozzle N of a fuel filling gun (refer to FIG. 9) is inserted; a flame arrester 62; and a gun stopper 63 that prevents abutting between the nozzle N inserted into the fuel filler guide tube 61 and the flame arrester 62.

The fuel filler guide tube 61 includes a tube main body 64 of cylindrical shape; and a mounting portion 65 in which an upper end side of the tube main body 64 is molded to fold at substantially a right angle outwards, as shown in FIGS. 6 and 7.

The flame arrester 62 permits the flow of fuel to inside of the fuel tank 16, and is configured to allow the air inside of the fuel tank 16 to discharge. The flame arrester 62 includes a peripheral wall 66 of cylindrical shape, and a cap member 67 that covers a lower end side of the peripheral wall 66, as shown in FIGS. 6 to 9.

The peripheral wall 66 includes a plurality of communicating holes 68 formed over the entire circumference thereof. The communicating holes 68 permit the flow of fuel to inside of the fuel tank 16, and permits the discharge of air inside of the fuel tank 16. The diameter D1 of the communicating hole 68 is preferably at least 0.5 mm and no more than 1.5 mm, and more preferably is 1 mm.

The peripheral wall 66 is configured by a punching plate, which is a metal plate member in which a plurality of the communicating holes 68 have been formed, being curved and molded into a cylindrical shape.

The cap member 67 includes a bottom portion 69 of a disk shape; and a side portion 70 that continues to the peripheral edge of the bottom portion 69 and rolls out downwards from the peripheral edge of the bottom portion 69. The bottom portion 69 includes a plurality of communicating holes 71 formed over the entire surface thereof. The communicating holes 71 have the same function as the communicating holes 68 of the peripheral wall 66. The diameter D2 of the communicating holes 71 is configured to be larger than the diameter D1 of the communicating holes 68 formed in the peripheral wall 66. More specifically, the diameter D2 of the communicating holes 71 is preferably at least 1 mm and no more than 1.8 mm, and more preferably is 1.5 mm.

The cap member 67 is connected to an inner circumference side of the peripheral wall 66 at an outer circumference side of the side portion 70.

The cap member 67 is configured by the peripheral edge of a punching plate of disk shape being molded to fold at substantially a right angle downwards.

It should be noted that the bottom portion 69 of the cap member 67 may not include communicating holes 71.

The above flame arrester 62 is fixed to the fuel filler guide tube 61, as shown in FIGS. 8 and 9. More specifically, the flame arrester 62 and fuel filler guide tube 61 are fixed by the inner circumference at an upper end side of the peripheral wall 66 of the flame arrester 62 and an outer circumference on a lower side of the tube main body 64 of the fuel filler guide tube 61 being joined by welding.

The gun stopper 63 includes an abutting portion 72 of rectangular plate shape; and a pair of support portions 73, 74 that extends from both ends in the length direction of the abutting portion 72 substantially perpendicularly to the abutting portion 72 upwards, as shown in FIGS. 6 and 7.

The abutting portion 72 is disposed on the inside of the peripheral wall 66 so as to traverse the peripheral wall 66 in a radial direction. The abutting portion 72 has a reverse-V shape having a cross-sectional shape in the width direction that is convex upwards, as shown in FIGS. 6 and 7. The nozzle N inserted into the fuel filler guide tube 61 is abutted by the abutting portion 72, as shown in FIG. 9. In other words, the abutting portion 72 prevents abutting of the nozzle N to the cap member 67 and peripheral wall 66 by causing the nozzle N to abut therewith. The pair of support portions 73, 74 extends from the abutting portion 72 upwards.

The width of the pair of support portions 73, 74 gradually widens upwards, and further broadens at the upper end side, as shown in FIG. 9.

The above gun stopper 63 is fixed to the flame arrester 62. More specifically, the gun stopper 63 and flame arrester 62 are fixed by the outer faces of the respective broadening portions at the upper end of the pair of support portions 73, 74 of the gun stopper 63 being joined by welding to the inner face of the peripheral wall 66 of the flame arrester 62, as shown in FIGS. 8 and 9.

The above fuel filler port device 60 is fixed to the fuel filler port 53 of the fuel tank 16 in a state in which the fuel filler guide tube 61, flame arrester 62 and gun stopper 63 have been fixed as described above. More specifically, the fuel filler port device 60 is fixed to the fuel tank 16 (tank upper 49) by the mounting portion 65 being welded from the interior of the fuel tank 16 (tank upper 49) to the peripheral edge of the fuel filler port 53.

With the fuel filler port device 60 of the present embodiment, the length a in the axial direction of the tube main body 64 of the fuel filler guide tube 61 is configured to be shorter than the length c in the axial direction of the peripheral wall 66 of the flame arrester 62, as shown in FIG. 9. In addition, the total length of the length a in the axial direction of the tube main body 64 of the fuel filler guide tube 61 and the length b from the lower end of the tube main body 64 to the upper end of the abutting portion 72 of the gun stopper 63 is configured to be a length c/2 approximately half of the length c in the axial direction of the peripheral wall 66 of the flame arrester 62.

Next, a case of performing fuel filling in the fuel tank 16 equipped with the fuel filler port device 60 of the first embodiment will be explained.

In a case of performing fuel filling to the fuel tank 16, first, the nozzle N of the fuel filler gun inserted from the fuel filler port 53 is inserted into the fuel filler guide tube 61, as shown in FIG. 9. The nozzle N inserted in the fuel filler guide tube 61 has a leading end that can be inserted until abutting the abutting portion 72 of the gun stopper 63.

Next, fuel filling is initiated by manipulating the fuel filler gun, and fuel is released from the leading end of the nozzle N. The fuel released from the nozzle N passes through the plurality of communicating holes 71 formed in the cap member 67 of the flame arrester 62 and the plurality of communicating holes 68 formed in the peripheral wall 66, and comes to be contained inside of the fuel tank 16.

Upon continuing fuel filling to inside of the fuel tank 16, the liquid surface inside of the fuel tank 16 gradually rises and reaches the cap member 67 of the flame arrester 62, and the cap member 67 sinks below the liquid surface. Herein, even if the cap member 67 sinks below the liquid surface and the plurality of communicating holes 71 are blocked, the plurality of communicating holes 68 is formed in the peripheral wall 66 of the flame arrester 62. The fuel released from the nozzle N thereby flows from the plurality of communicating holes 68 to inside of the fuel tank 16, while air inside of the fuel tank 16 is discharged from the plurality of communicating holes 68; therefore, the fuel is smoothly supplied.

Upon fuel filling continuing further, the liquid surface gradually rises on the peripheral wall 66, and reaches the abutting portion 72 of the gun stopper 63. Herein, even if the liquid surface reaches the abutting portion 72 of the gun stopper 63, and a lower part of the peripheral wall 66 than the abutting portion 72 sinks below the liquid surface, the peripheral wall 66 is disposed to span a higher part than the abutting portion 72. The fuel released from the nozzle N thereby flows from the plurality of communicating holes 68 formed in a higher part of the peripheral wall 66 than the abutting portion 72 to the inside of the fuel tank 16, while the air inside of the fuel tank 16 is discharged from the plurality of communicating holes 68; therefore, fuel is still supplied smoothly.

The following such effects are exerted according to the fuel filler port device 60 of the first embodiment explained above.

The flame arrester 62 is disposed so as to be positioned from above to below a position to which a leading end portion of the nozzle N of the fuel filler gun inserted inside of the fuel filler guide tube 61 can be maximally inserted. In other words, the flame arrester 62 is configured to allow the nozzle N of the fuel filler gun inserted inside of the fuel filler guide tube 61 to be inserted lower than an upper end of the flame arrester 62. Air in an upper portion of the fuel tank 16 can thereby discharge by way of the portion of the flame arrester 62 positioned further above the leading end portion of the nozzle N, while fuel can be allowed to flow inside of the fuel tank 16. Therefore, the stored amount of fuel can be increased by using the space of the upper portion of the fuel tank 16, without leading to an increase in the size of the fuel filler guide tube 61.

In addition, the gun stopper 63 having the abutting portion 72 abutted by the leading end side of the nozzle N is disposed below the fuel filler guide tube 61, and the flame arrester 62 is disposed to span from above to below the abutting portion 72. The air in an upper portion of the fuel tank 16 can thereby discharged by way of the portion of the flame arrester 62 positioned higher than the abutting portion 72, while fuel can be allowed to flow to inside of the fuel tank 16. Therefore, by raising the liquid surface level of the fuel tank 16 to higher part than the abutting portion 72, it is possible to increase the stored amount of fuel by using the space at an upper portion of the fuel tank 16, without leading to an increase in the size of the fuel filler guide tube 61.

In addition, the flame arrester 62 is configured to include the peripheral wall 66 that surrounds the entire circumference of the nozzle N, and the plurality of communicating holes 68 is formed over the entire periphery of the peripheral wall 66. The flow of fuel to inside of the fuel tank 16 and the discharge of air inside of the fuel tank 16 through the plurality of communicating holes 68 are thereby made smooth.

In addition, the flame arrester 62 is configured to include the cap member 67 covering the lower end side of the peripheral wall 66, and the plurality of communicating holes 71 is formed in the cap member 67. The flow of fuel to inside of the fuel tank 16 and the discharge of air inside of the fuel tank 16 though the plurality of communicating holes 71 in the cap member 67 are thereby made smoother.

In addition, the gun stopper 63 is fixed to the flame arrester 62, the flame arrester 62 is subsequently fixed to the fuel fuller guide tube 61, and the fuel filler guide tube 61 is fixed to the fuel filler port 53. Since the fuel filler guide tube 61, gun stopper 63 and flame arrester 62 are thereby mounted to the fuel tank 16 in a sub-assembly form, mounting of the fuel filler guide tube 61, gun stopper 63 and flame arrester 62 to the fuel tank 16 is facilitated.

In addition, the gun stopper 63 is disposed so as to traverse the peripheral wall 66 in a radial direction, and both ends of the gun stopper 63 are fixed to the peripheral wall 66. It is thereby possible to improve the rigidity against forces applied in the radial direction on the peripheral wall 66.

In addition, since air inside of the fuel tank 16 does not discharge from the surrounding of the fuel filler guide tube 61, a space in which it is difficult to store fuel is formed around the portion inside of the fuel tank 16 at which the fuel filler guide tube 61 is disposed. Therefore, the length a of the fuel filler guide tube 61 in the axial direction is made shorter than the length c of the flame arrester 62 in the axial direction. The volume of the space formed at the periphery of the fuel filler guide tube 61 and in which air does not escape and it is difficult to contain fuel can thereby be made smaller.

In addition, the abutting portion 72 is positioned at a center of the flame arrester 62 in the axial direction. The abutting portion 72 thereby comes to be positioned at an adequate depth from the fuel filler port 53, whereby the nozzle N can be inserted an adequate length from the fuel filler port 53. In addition, since the flame arrester 62 is disposed until above the abutting portion 72, while the abutting portion 72 is at a sufficient depth from the fuel filler port 53, air in an upper portion of the fuel tank 16 can be discharged, and fuel can be allowed to flow inside of the fuel tank 16, by way of the flame arrester 62 positioned at a higher part than the abutting portion 72.

In addition, the plurality of communicating holes 71 in the cap member 67 are configured to be larger than the diameter of the plurality of communicating holes 68 in the peripheral wall 66. Therefore, since fuel can be smoothly supplied from the plurality of communicating holes 71 of the cap member 67 disposed at a lower part than the peripheral wall 66, the decline in the supply rate of fuel can be reduced.

Figure 10:
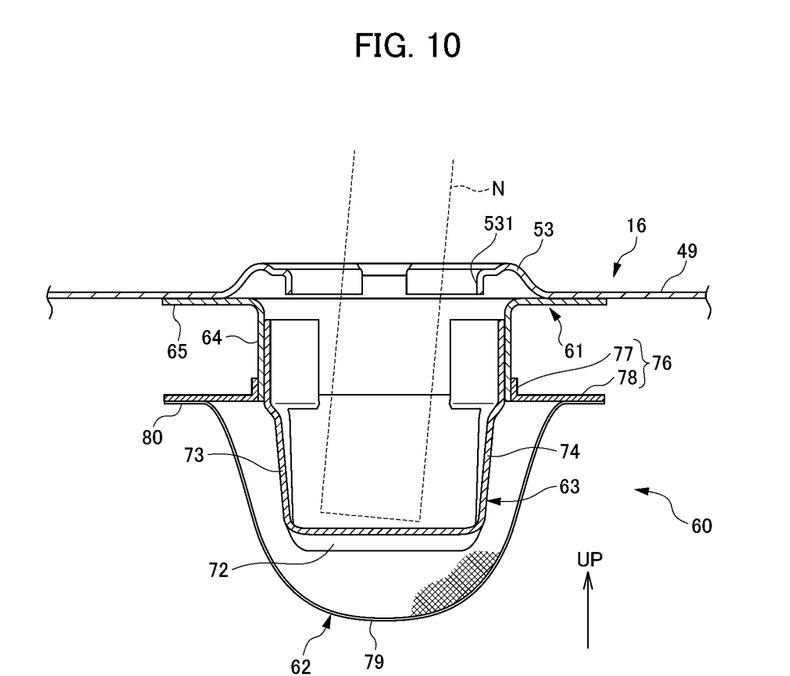
FIG. 10 is a cross-sectional view around a fuel filler port of a fuel tank including a fuel filler port device according to a second embodiment of the present invention.

Next, a second embodiment of a fuel filler port device of the present invention will be explained while referencing FIG. 10. FIG. 10 is a cross-sectional view showing a configuration around the fuel filler port of a fuel tank equipped with the fuel filler port device according to the second embodiment.

It should be noted that, in the explanation of the second embodiment and later, the same reference symbols are affixed to the same constituent elements, and explanations thereof will be omitted or simplified.

The fuel filler port device 60 of the second embodiment differs from the first embodiment in the configuration of the flame arrester 62 and the arrangement of the gun stopper 63.

More specifically, as shown in FIG. 10, the flame arrester 62 includes a net portion 79 configured from a wire mesh and having a bowl shape in which an upper face is open; and an edge 80 molded to be folded outwards so that an outer circumferential edge of the net portion 79 is a flat plate shape. The diameter at the upper face of the flame arrester 62 is configured to be larger than the diameter of the tube main body 64 of the fuel filler guide tube 61.

In the second embodiment, the flame arrester 62 is fixed to the fuel filler guide tube 61 via a flange member 76, as shown in FIG. 10.

The flange member 76 includes a tube-side joining part 77 having an inside diameter of substantially the same diameter as the outside diameter of the tube main body 64, and an extension part 78 that extends from the tube-side joining part 77 to outside in a substantially perpendicular direction.

The flame arrester 62 and the fuel filler guide tube 61 are fixed by the edge 80 of the flame arrester 62 being welded to the extension part 78 of the flange member 76, and the tube-side joining part 77 of the flange member 76 being welded to the outer circumferential face of the tube main body 64.

In addition, in the second embodiment, the gun stopper 63 is welded to the inner circumferential face of the tube main body 64 of the fuel filler guide tube 61, as shown in FIG. 10.

The same effects as the first embodiment are exerted according to the fuel filler port device 60 of the second embodiment.

Figure 11:
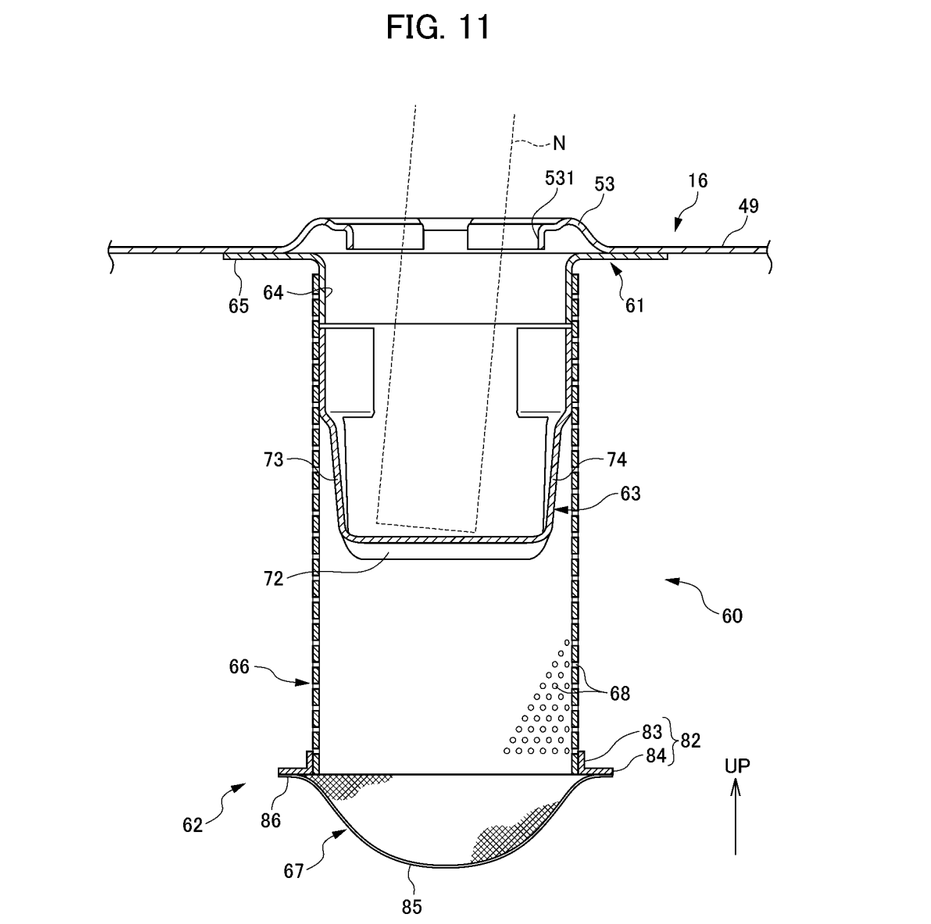
FIG. 11 is a cross-sectional view around a fuel filler port of a fuel tank including the fuel filler port device according to a third embodiment of the present invention.

Next, a third embodiment of a fuel filler port device of the present invention will be explained while referencing FIG. 11. FIG. 11 is a cross-sectional view showing the configuration around a fuel filler port of a fuel tank equipped with the fuel filler port device according to the third embodiment.

The fuel filler port device 60 of the third embodiment differs from the first embodiment in the configuration of the cap member 67.

More specifically, as shown in FIG. 11, the cap member 67 includes a net portion 85 configured from a wire mesh and having a bowl shape in which an upper face is open; and an edge 86 molded to be folded outwards so that an outer circumferential edge of the net portion 85 is a flat plate shape. The diameter at the upper face of the cap member 67 is configured to be larger than the diameter of the peripheral wall 66.

In the third embodiment, the cap member 67 is fixed to the peripheral wall 66 via a flange member 82, as shown in FIG. 11.

The flange member 82 includes a peripheral-wall joining part 83 having an inside diameter of substantially the same diameter as the outside diameter of the peripheral wall 66, and an extension part 84 that extends from the peripheral-wall joining part 83 to outside in a substantially perpendicular direction.

The cap member 67 and peripheral wall 66 are fixed by the edge 86 of the cap member 67 being welded to the extension part 84 of the flange member 82, and the peripheral-wall joining part 83 of the flange member 82 being welded to the outer circumferential face of the peripheral wall 66.

The same effects as the first embodiment are exerted according to the fuel filler port device 60 of the third embodiment.

Although respective preferred embodiments of the present invention have been explained in the foregoing, the present invention is not to be limited to the aforementioned embodiments, and can be implemented in various forms.

For example, in the first embodiment, the gun stopper 63 is fixed to the flame arrester 62, and the flame arrester 62 is fixed to the fuel filler guide tube 61 (i.e. the gun stopper 63 is indirectly fixed to the fuel filler guide tube 61); however, it is not limited thereto. In other words, the gun stopper and flame arrester may be directly fixed to the fuel filler guide tube.

In addition, although the fuel filler port device 60 of the present invention is applied to the fuel tank of a motorcycle as the straddled vehicle in the first to third embodiments, it is not limited thereto. That is, the present invention may be applied to the fuel tank of a three-wheeled or four-wheeled straddled vehicle. In other words, straddled vehicle includes all vehicles ridden by straddling the chassis.

The invention claimed is:

1. A fuel filler port device of a fuel tank for a straddled vehicle, comprising:
   a fuel filler guide tube that extends from a fuel filler port provided at a superior wall of a fuel tank to the inside of the fuel tank, and guides a nozzle (N) of a fuel filler gun inserted from the fuel filler port to the inside of the fuel tank; and
   a flame arrester disposed below the fuel filler guide tube and permits flow of fuel to the inside of the fuel tank, and allows air inside of the fuel tank to be discharged,
   wherein the flame arrester is provided to allow the nozzle (N) of the fuel filler gun inserted from the fuel filler port to be inserted further downwards than an upper end of the flame arrester,
   the fuel filler port device further comprising a gun stopper that has an abutting portion disposed below the fuel filler guide tube for abutting a leading end side of the nozzle, thereby restricting the insertion of the nozzle (N) to inside of the fuel tank,
   wherein the flame arrester is disposed to span positions from above to below the abutting portion of the gun stopper, and includes a peripheral wall of cylindrical shape surrounding an entire circumference of the nozzle (N) inserted inside of the fuel filler guide tube,
   wherein the peripheral wall contains a plurality of communicating holes formed over the entire periphery thereof, and
   wherein the gun stopper is disposed so as to traverse inside of the peripheral wall in a radial direction, and is fixed to the peripheral wall at both ends of the gun stopper.

2. The fuel filler port device of a fuel tank for a straddled vehicle according to claim 1,
   wherein the flame arrester further includes a cap member covering a lower end side of the peripheral wall,
   wherein the cap member has a plurality of communicating holes.

3. The fuel filler port device of a fuel tank for a straddled vehicle according to claim 1,
   wherein the gun stopper and the flame arrester are directly or indirectly fixed to the fuel filler guide tube, and
   wherein the fuel filler guide tube is fixed to the fuel filler port.

4. The fuel filler port device of a fuel tank for a straddled vehicle according to claim 1, wherein a length of the fuel filler guide tube in an axial direction is shorter than a length of the flame arrester in the axial direction.

5. The fuel filler port device of a fuel tank for a straddle vehicle according to claim 1, wherein the abutting portion is positioned at a center of the frame arrester in an axial direction.

6. The fuel filler port device of a fuel tank for a straddled vehicle according to claim 2, wherein a diameter (D2) of the plurality of communicating holes in the cap member is greater than a diameter (D1) of the plurality of communicating holes in the peripheral wall.

* * * * *